(12) United States Patent  (10) Patent No.: US 6,997,308 B2
Guemsey  (45) Date of Patent: Feb. 14, 2006

(54) WELDED CONVEYOR BELT MODULES, BELTS MADE OF WELDED MODULES, AND METHOD OF MAKING WELDED MODULES

(75) Inventor: Kevin W. Guemsey, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/710,450

(22) Filed: Jul. 12, 2004

(65) Prior Publication Data

US 2006/0006051 A1    Jan. 12, 2006

(51) Int. Cl.
B65G 17/06    (2006.01)
(52) U.S. Cl. .................. 198/850; 198/851; 198/852; 198/853
(58) Field of Classification Search ........ 198/850–853, 198/957
See application file for complete search history.

(56) References Cited

U.S. PATENT DOCUMENTS

| 4,105,111 | A | * | 8/1978 | Lapeyre ................... 198/844.2 |
| 4,325,478 | A | * | 4/1982 | Richard ..................... 198/699 |
| 4,394,208 | A | * | 7/1983 | Wang et al. ............. 156/580.1 |
| 4,465,178 | A |   | 8/1984 | Coggon ....................... 198/688 |
| 4,757,576 | A | * | 7/1988 | Jaubert ........................ 24/31 R |
| 4,840,269 | A | * | 6/1989 | Anderson ................... 198/822 |
| 4,925,016 | A |   | 5/1990 | Lapeyre ....................... 198/834 |
| 5,558,208 | A |   | 9/1996 | Kucharski ................... 198/848 |
| 5,954,187 | A | * | 9/1999 | Hager ......................... 198/778 |
| 6,050,394 | A | * | 4/2000 | Daringer et al. ............ 198/778 |
| 6,148,496 | A | * | 11/2000 | McGuire et al. .............. 29/428 |
| 6,195,868 | B1 | * | 3/2001 | Etherington et al. ........ 29/522.1 |
| 6,360,882 | B1 | * | 3/2002 | Maine et al. ............... 198/852 |
| 6,371,284 | B1 | * | 4/2002 | Pasch ......................... 198/848 |
| 6,474,464 | B1 |   | 11/2002 | Horton et al. .............. 198/853 |
| 6,571,939 | B1 | * | 6/2003 | Tarnawskyj et al. ...... 198/844.2 |
| 2004/0222073 | A1 |   | 11/2004 | Oreste ......................... 198/850 |

* cited by examiner

*Primary Examiner*—Douglas Hess
(74) *Attorney, Agent, or Firm*—James T. Cronvich

(57) ABSTRACT

Welded belt modules, belts made of such modules, and a method for making such modules. Wide belt modules are made by welding together side to side narrow belt modules to a selected width. Modular conveyor belts are constructed of rows of welded modules connected serially by hinge pins between interleaved hinge eyes of consecutive rows. The wider welded modules eliminate or reduce the number of gaps, or seams, in a conveyor belt by reducing the number of narrow modules in each belt row.

5 Claims, 4 Drawing Sheets

WELDED CONVEYOR BELT MODULES, BELTS MADE OF WELDED MODULES, AND METHOD OF MAKING WELDED MODULES

BACKGROUND OF INVENTION

The invention is related generally to power-driven conveyor belts and, more particularly, to modular plastic conveyor belts made of modules welded together side to side.

As shown in FIG. 1, modular plastic conveyor belts are typically constructed of a series of rows 10 of belt modules 12 arranged end to end and side by side in a bricklay pattern. Hinge pins 14 received in interleaved hinge eyes 16 alternately extending from consecutive rows connect the rows together at hinge joints 18 into a conveyor belt that can articulate at the hinge joints. But longitudinal gaps, or seams 20, extending through the thickness of the belt are formed between adjacent side-by-side modules in a row. The seams, which can harbor bacteria and other contaminants, can be difficult to clean. This is of particular concern in the meat and poultry industries where sanitation is important. Furthermore, there is a decrease in a belt's lateral stiffness, or beam strength, because of the presence of the seams. One way to overcome these problems is to mold a wide belt module whose lateral width is much longer than its longitudinal pitch. Although this can be done, molding wide modules that do not twist out of plane requires large, expensive mold cavities and careful control of molding parameters. And molding wide modules to a variety of widths to accommodate different demands may not be cost effective.

Thus, there is a need for wide belt modules to form easy-to-clean belts in a variety of widths.

SUMMARY OF INVENTION

This need and other needs are satisfied by a conveyor belt embodying features of the invention. The belt is constructed of a series of rows of belt modules. Each row has leading hinge eyes spaced apart along a leading end of the row and trailing hinge eyes spaced apart along a trailing end. The leading hinge eyes along a trailing row are interleaved with the trailing hinge eyes of a leading row. Hinge pins are received in the interleaved hinge eyes between consecutive rows to connect the rows into a conveyor belt. Belt modules in each row are welded side to side to form a seamless portion of a row of adjacent modules.

According to another aspect of the invention, a wide conveyor belt module comprises individual narrow belt modules welded side to side.

In yet another aspect of the invention, a method for molding a wide conveyor belt module comprises: a) forming individual belt modules with opposite first and second side faces; b) welding the first side face of a module to the second side face of another module to form a welded module; and c) repeating b), as required, with the welded module and other modules to form a seamless wide conveyor belt module of predetermined width.

BRIEF DESCRIPTION OF DRAWINGS

These and other features, aspects, and advantages of the invention are better understood by reference to the following description, appended claims, and accompanying drawings, in which:

DETAILED DESCRIPTION

Figure 1:
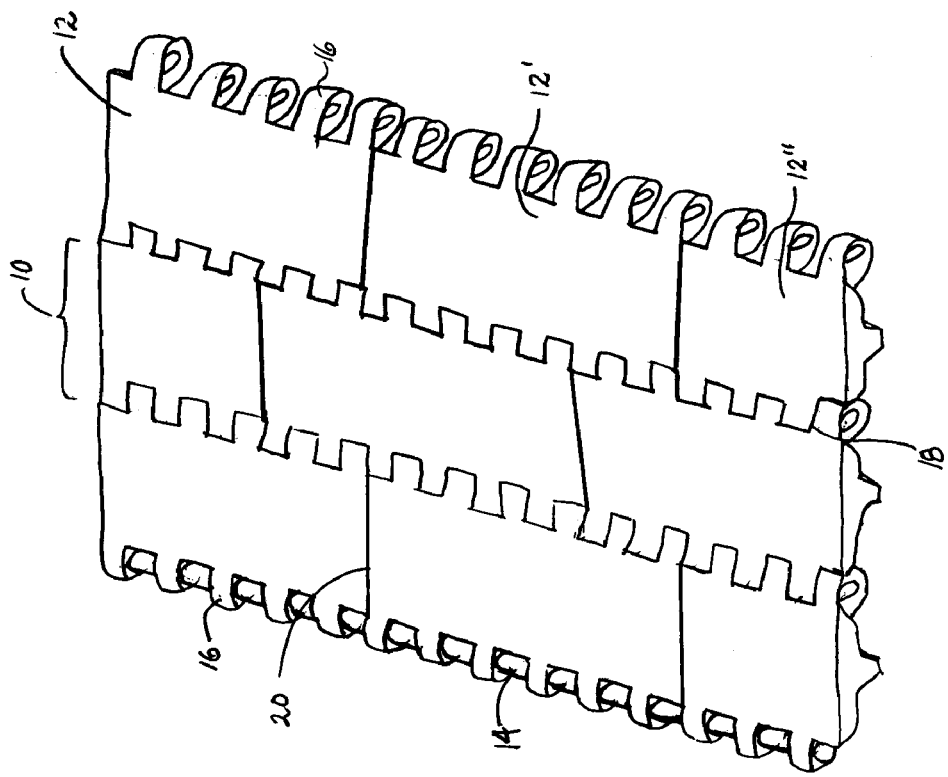
FIG. 1 is an isometric view of a portion of a typical modular conveyor belt built in a bricklay pattern.
Figure 2:
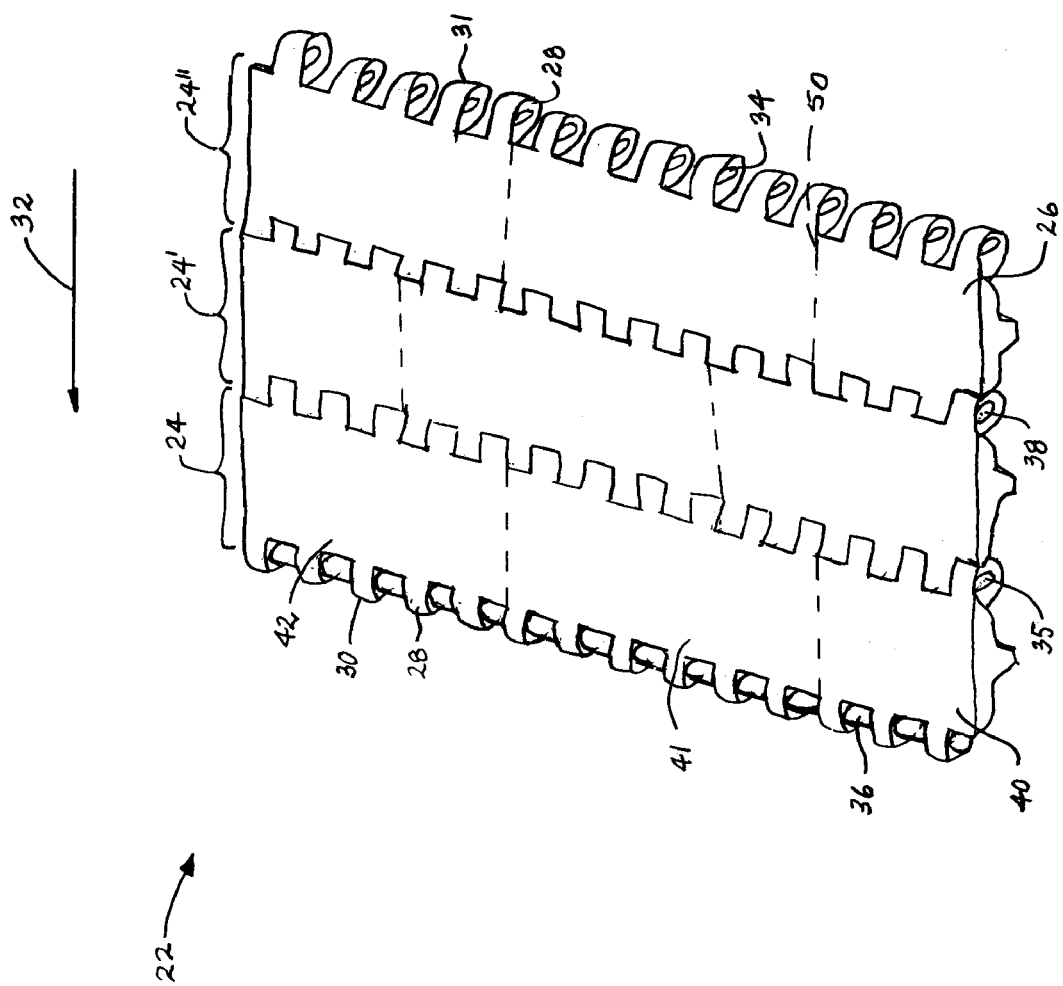
FIG. 2 is an isometric view of a portion of a seamless modular conveyor belt embodying features of the invention.

A portion of a conveyor belt embodying features of the invention is shown in FIG. 2. The belt is constructed of a series of rows 24, 24', 24" of wide belt modules 26. Each row has laterally spaced hinge eyes 28 along leading and trailing ends 30, 31 as defined when the belt travels in the direction indicated by arrow 32. The trailing hinge eyes along a leading row are interleaved with the leading hinge eyes along a trailing row. Aligned openings 34 in the interleaved hinge eyes form a lateral passageway 35 between consecutive rows. A hinge pin 36, received in the passageway, links consecutive rows together at a hinge joint 38 to form a conveyor belt that can articulate about drive and idler sprockets or drums.

Figure 4:
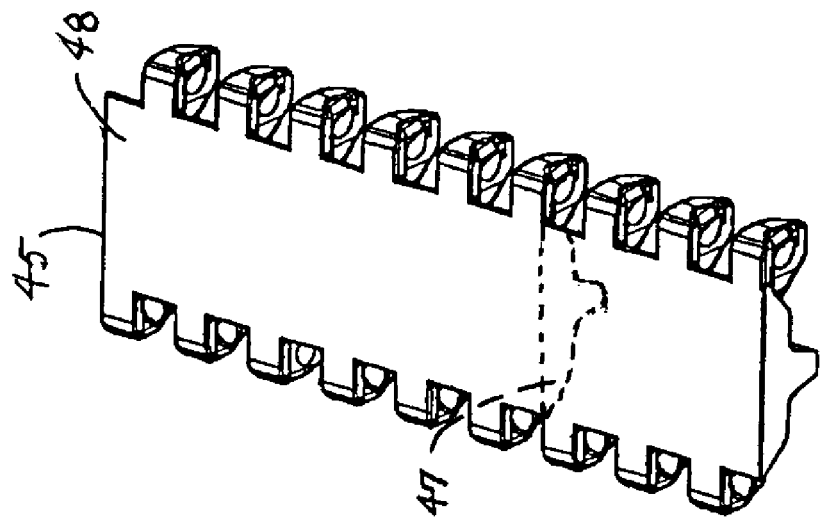
FIG. 4 is an isometric view of a wide belt module formed by welding together the two modules of FIG. 3.
Figure 3:
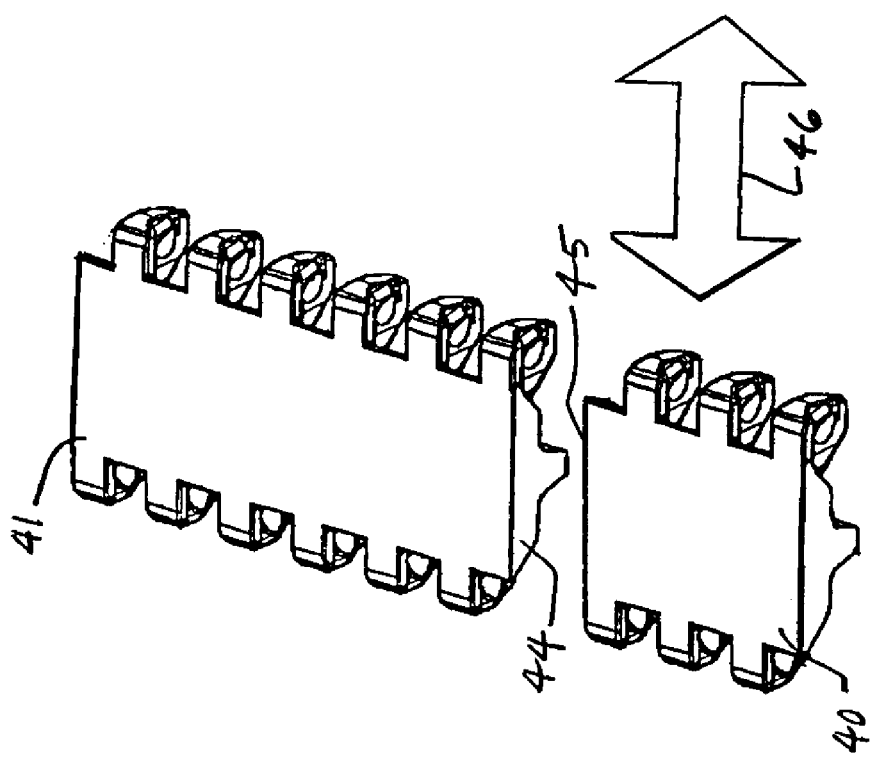
FIG. 3 is an isometric view of two individual belt modules before being welded side to side to form a wide belt module usable in the conveyor belt of FIG. 2.

In the example of FIG. 2, each wide module 26 is made of three narrow modules: a short edge module 40, an interior module 41, and a long edge module 42. The narrow modules are welded together according to the method illustrated in FIG. 3. First, a short edge module 40 and an interior module are formed, preferably by injection molding out of a thermoplastic polymer. The modules may be molded to width or molded wider and cut to width. Modules like these are manufactured and sold, for example, by Intralox, L.L.C. (www.intralox.com) of Harahan, La., USA. In this example, the interior module 41 is held stationary with the wall along a first side 44 facing a wall along a second side 45 of the short edge module 40. The two facing sides are moved into contact as the short edge module is rapidly reciprocated back and forth as indicated by two-headed arrow 46. The rapid rubbing of the two side faces against each other causes them to heat up, melt, and weld together. The two modules are joined along a weld area 47 into a single wider welded module 48, as shown in FIG. 4. The weld area forms a strong junction between the side-by-side modules without a gap, or seam, at the interface. Another module, such as a long edge module 42, can then be welded onto the second side 45 of the welded module 48 to form the wide welded module 26 forming each belt row 24 in FIG. 2. Of course, any number of modules of any width can be welded to the sides of welded modules to build a wide welded module of predetermined width.

The welding process described is preferably a vibration welding process, in which the reciprocating motion 46 imparted to one or the other of the module pieces to be welded is provided by a linear vibration welder. This kind of vibration welding device is manufactured by, for example, Branson Ultrasonics Corporation (www.bransonultrasonics.com) of Danbury, Conn., USA. But other welding technologies can be used accordingly with similar effect. Some examples include epoxies, electromagnetic welding, ultra sonic welding, orbital vibration welding, hot plate welding, and hot gas welding. Using these technologies to weld relatively narrow modules together into wider modules allows seamless belts of a selected width to be built.

Figure 5:
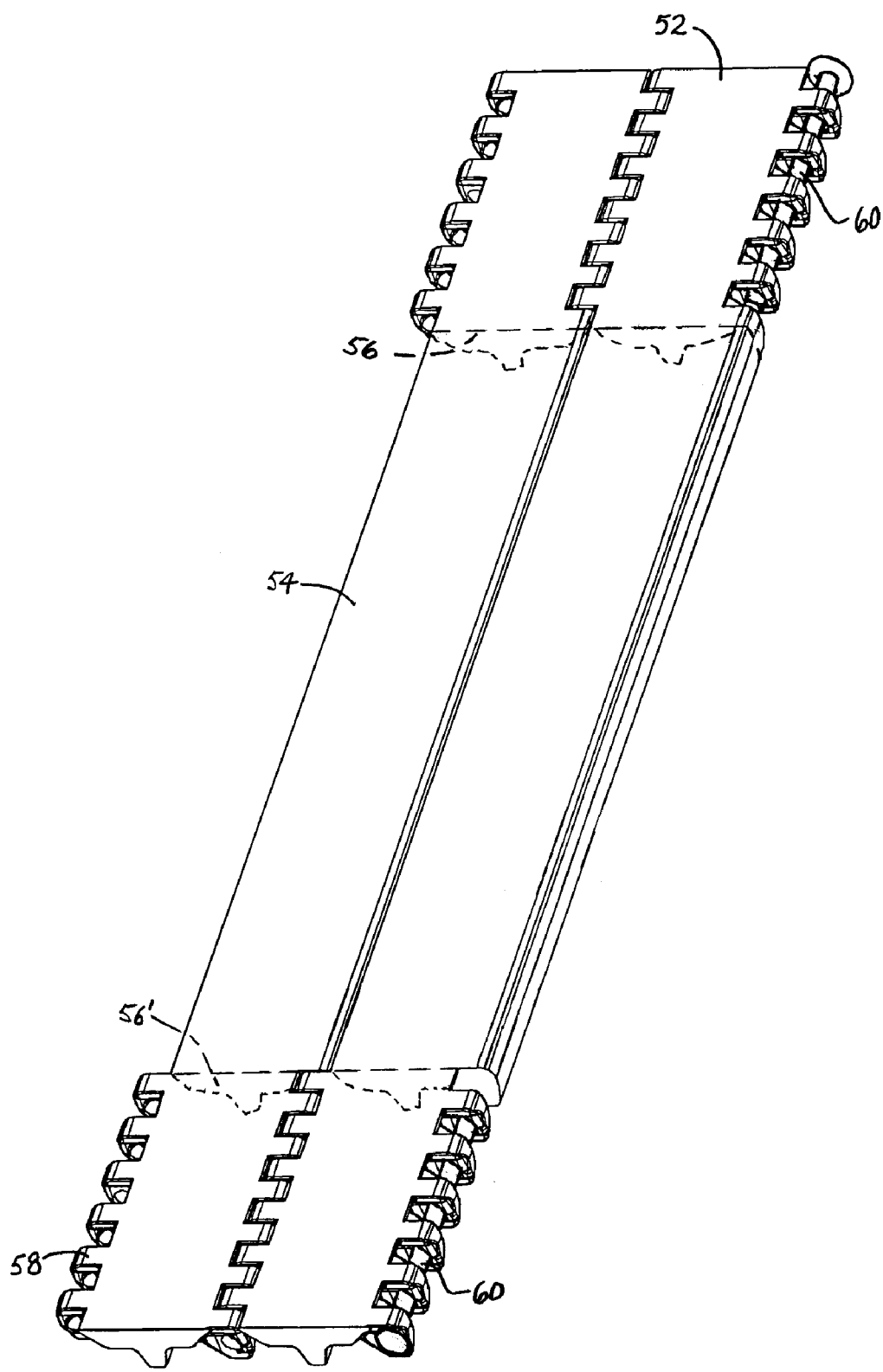
FIG. 5 is an isometric view of a portion of another version of a seamless conveyor belt embodying features of the invention and constructed of welded wide modules composed of welded-together narrow modules, some of which lack hinge eyes.

In addition to eliminating or reducing the number of seams between side-by-side belt modules for improved sanitation and increased beam strength, the welding process can be used to attach modules without hinge eyes to other modules. Shown in FIG. 5, a conveyor belt has edge modules 52 flanking interior slat modules 54, which lack hinge eyes. Without hinge eyes, the slat modules must be held in place in a belt by something other than the hinge pins used to link modules in conventional modular conveyor belts. Although the edge modules and slat modules in each row could be molded as a single wide module, they are preferably welded together along weld regions 56, 56' at the interface between the edge modules 52 and the slat modules 54. Hinge eyes 58 along the ends of the edge modules interleave with each other row to row and receive short hinge pins 60 to link the rows together into a conveyor belt with internal slats.

Although the invention has been described in detail with respect to a few preferred versions, other versions are possible. For example, welded modules can be positioned side by side with unwelded modules in a belt row. As another example, edge pieces with or without hinge eyes can be welded onto the sides of belt modules to give the sides of a belt certain characteristics, such as increased durability or a particular shape. As yet another example, the weld interface need not be along a straight line as shown in the drawings; it could be along a curved or stepped path. So, as these few examples suggest, the welded modules and belts and their method of making are not meant to be limited to the detailed descriptions of the preferred versions.

What is claimed is:

1. A conveyor belt comprising:
    a series of rows of belt modules having spaced apart hinge eyes along leading and trailing ends of each row and arranged end to end with the leading hinge eyes along a trailing row interleaved with the trailing lunge eyes along a leading row;
    a plurality of hinge pins received in the interleaved hinge eyes between consecutive rows to connect the rows into a conveyor belt;
    wherein each row includes a plurality of belt modules having side faces, wherein adjacent belt modules are welded side to side at facing, like-shaped side faces to form a seamless portion of a row of adjacent belt modules.

2. A conveyor belt as in claim 1 wherein at least some of the belt modules lack hinge eyes along the leading and trailing ends.

3. A conveyor belt as in claim 1 wherein adjacent belt modules are welded by a vibration welding process.

4. A method for making a wide conveyor belt module comprising:
    forming a plurality of individual narrow belt modules with opposite like-shaped first and second side faces across the width of each module;
    welding the first side face of a narrow module to the second side face of another narrow module to form a welded module;
    repeating, as required, the welding step with the welded module and other narrow modules to form a seamless wide conveyor belt module of predetermined width.

5. A method for making a wide conveyor belt module as in claim 4 wherein the narrow belt modules are welded to each other by a vibration welding process.

* * * * *